United States Patent
Diep et al.

(10) Patent No.: US 10,464,691 B2
(45) Date of Patent: *Nov. 5, 2019

(54) SELF-BALANCING PRESSURE BULKHEAD

(71) Applicant: The Boeing Company, Chicago, IL (US)

(72) Inventors: Paul Diep, Bothell, WA (US); Bernhard Dopker, Bellevue, WA (US); Robert W. Johnson, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,430

(22) Filed: Dec. 5, 2018

(65) Prior Publication Data

US 2019/0106222 A1 Apr. 11, 2019

Related U.S. Application Data

(62) Division of application No. 13/915,994, filed on Jun. 12, 2013, now Pat. No. 10,189,578.

(51) Int. Cl.
*B64D 45/00* (2006.01)
*B62D 25/00* (2006.01)
*B63B 3/60* (2006.01)
*B64C 1/10* (2006.01)

(52) U.S. Cl.
CPC ............ *B64D 45/00* (2013.01); *B62D 25/00* (2013.01); *B63B 3/60* (2013.01); *B64C 1/10* (2013.01);
(Continued)

(58) Field of Classification Search
CPC .. B62D 25/00; B63B 3/60; B64C 1/10; B64D 45/00; Y10T 29/49826; Y10T 428/215
See application file for complete search history.

(56) References Cited

U.S. PATENT DOCUMENTS 3,663,344 A * 5/1972 Brock .................. B29C 70/202
428/76
4,728,059 A * 3/1988 Stephen ................ B64D 25/00
244/119

(Continued)

FOREIGN PATENT DOCUMENTS

EP 387400 A2 4/2002
EP 2098448 A1 9/2009
(Continued)

OTHER PUBLICATIONS

Extended European Search Report, European Application No. 14169530.4, dated Nov. 5, 2014.
(Continued)

*Primary Examiner* — Medhat Badawi
(74) *Attorney, Agent, or Firm* — Vivacqua Law

(57) ABSTRACT

A pressure bulkhead for a vehicle disclosed. The pressure bulkhead is configured to separate a pressurized interior from an unpressurized interior of the vehicle. The pressure bulkhead includes a bulkhead wall having a radially inner disk and a radially outer compression ring. The radially inner disk has a surface and a first thickness and the radially outer compression ring having a second thickness that is greater than the first thickness. The radially outer compression ring defines a periphery of the bulkhead wall and the second thickness of the radially outer compression ring is effective to provide a strength to oppose meridional and hoop stresses across the surface of the radially inner disk in response to a pressure differential across the bulkhead wall. The pressure bulkhead also includes an attachment ring that is affixed to the periphery of the bulkhead wall.

20 Claims, 10 Drawing Sheets

(52) U.S. Cl.
CPC ...... *Y10T 29/49826* (2015.01); *Y10T 428/215* (2015.01)

(56) References Cited

U.S. PATENT DOCUMENTS

| | | | | |
|---|---|---|---|---|
| 4,867,357 A * | 9/1989 | Inglis | F42B 15/36 244/121 |
| 5,024,399 A * | 6/1991 | Barquet | B29C 70/44 244/119 |
| 5,062,589 A * | 11/1991 | Roth | B64C 1/10 244/117 R |
| 5,125,600 A * | 6/1992 | Brumbaugh | F42B 15/36 244/121 |
| 5,143,276 A * | 9/1992 | Mansbridge | B21D 26/055 228/157 |
| 5,167,386 A * | 12/1992 | Laquer | B64G 1/645 102/378 |
| 5,171,510 A * | 12/1992 | Barquet | B29C 70/44 264/258 |
| 5,743,492 A * | 4/1998 | Chan | B64F 1/04 102/274 |
| 5,820,077 A * | 10/1998 | Sutliff | B64C 1/36 244/119 |
| 5,934,616 A * | 8/1999 | Reimers | B64C 1/10 244/119 |
| 6,213,426 B1 * | 4/2001 | Weber | B64C 1/10 244/117 R |
| 6,378,805 B1 * | 4/2002 | Stephan | B64C 1/10 244/117 R |
| 6,435,786 B1 * | 8/2002 | Breckel | B64D 9/00 410/118 |
| 6,443,392 B2 | 9/2002 | Weber et al. | |
| 6,478,254 B2 * | 11/2002 | Matsui | B64C 1/10 244/119 |
| 6,679,453 B2 * | 1/2004 | Steiner | F42B 15/01 244/121 |
| 7,082,878 B2 * | 8/2006 | Facciano | F42B 10/46 102/377 |
| 7,093,799 B1 * | 8/2006 | Dulat | F42B 10/46 244/117 R |
| 7,384,015 B2 * | 6/2008 | Dazet | B64C 1/06 244/117 R |
| 7,503,523 B2 * | 3/2009 | Perez-Sanchez | B64C 1/36 220/810 |
| 7,677,498 B2 * | 3/2010 | Jeanneau | B64C 1/36 244/119 |
| 7,699,260 B2 * | 4/2010 | Hughey | B64C 31/028 244/17.11 |
| 7,766,277 B2 * | 8/2010 | Anderson | B64C 1/10 244/121 |
| 7,909,289 B2 | 3/2011 | Perez-Sanchez | |
| 7,997,529 B2 * | 8/2011 | Koch | B64C 1/062 244/117 R |
| 8,061,656 B1 * | 11/2011 | Renn | B64C 1/1476 244/122 AE |
| 8,226,870 B2 * | 7/2012 | Garcia Laja | B64C 1/10 264/238 |
| 8,322,655 B1 * | 12/2012 | Kismarton | B64C 5/02 244/119 |
| 8,333,151 B2 * | 12/2012 | Krisher | F42B 15/36 102/378 |
| 8,366,043 B2 * | 2/2013 | Stephan | B64C 1/10 244/119 |
| 8,434,717 B2 * | 5/2013 | Meyer | B64C 1/36 244/121 |
| 8,444,089 B2 * | 5/2013 | Mischereit | B64C 1/10 244/118.5 |
| 8,497,456 B2 * | 7/2013 | Eisentraut | F42B 15/36 244/3.1 |
| 8,519,312 B1 * | 8/2013 | Merems | F42B 10/46 244/1 R |
| 8,651,422 B2 * | 2/2014 | Noebel | B64C 1/068 244/119 |
| 8,702,038 B2 * | 4/2014 | Bauer | B64C 1/10 244/120 |
| 8,870,118 B2 * | 10/2014 | Moselage, III | B64C 1/069 244/120 |
| 8,939,404 B2 * | 1/2015 | Sayilgan | B64C 1/061 244/119 |
| 9,213,097 B2 * | 12/2015 | Mialhe | H01Q 1/281 |
| 9,399,507 B2 * | 7/2016 | Rosman | B64C 1/12 |
| 9,637,215 B2 * | 5/2017 | Joern | B64C 1/10 |
| 9,776,704 B1 * | 10/2017 | Rufino | B64C 1/10 |
| 2001/0025903 A1 | 10/2001 | Weber et al. | |
| 2001/0035118 A1 | 11/2001 | Matsui et al. | |
| 2002/0146278 A1 * | 10/2002 | Wolfgang | B64G 1/641 403/188 |
| 2002/0178583 A1 * | 12/2002 | Holman | B64C 1/10 29/897 |
| 2004/0035979 A1 * | 2/2004 | McCoskey, Jr. | B64C 1/12 244/117 R |
| 2006/0145940 A1 * | 7/2006 | Kuroda | H01Q 1/42 343/911 R |
| 2006/0266886 A1 * | 11/2006 | Nachbar | B64B 1/06 244/125 |
| 2007/0164159 A1 | 7/2007 | Koch et al. | |
| 2009/0104418 A1 * | 4/2009 | Ohki | B29C 43/003 428/213 |
| 2009/0173824 A1 | 7/2009 | Perez-Sanchez | |
| 2010/0065685 A1 * | 3/2010 | Basso | B64C 1/10 244/119 |
| 2010/0155533 A1 * | 6/2010 | McKinnie | B64C 1/10 244/121 |
| 2010/0176240 A1 * | 7/2010 | Guering | B64C 1/061 244/102 R |
| 2010/0176241 A1 | 7/2010 | Meyer et al. | |
| 2010/0243806 A1 * | 9/2010 | Vera Villares | B64C 1/10 244/119 |
| 2010/0310242 A1 * | 12/2010 | Zubalsky | F41G 7/2213 396/12 |
| 2011/0101164 A1 | 5/2011 | Koch et al. | |
| 2012/0097793 A1 * | 4/2012 | Fort | B64C 1/1492 244/129.1 |
| 2012/0119031 A1 * | 5/2012 | Ainsworth | B64C 1/1492 244/129.3 |
| 2012/0138728 A1 * | 6/2012 | Brunton | F41G 7/2213 244/3.16 |
| 2013/0021214 A1 * | 1/2013 | Zimmerman | H01Q 3/08 343/761 |
| 2013/0087657 A9 | 4/2013 | Koch et al. | |
| 2013/0214093 A1 * | 8/2013 | White | B64C 7/00 244/121 |
| 2014/0117157 A1 * | 5/2014 | Diep | B64C 1/12 244/120 |
| 2014/0322484 A1 * | 10/2014 | Teshima | F16F 7/12 428/116 |
| 2014/0370227 A1 * | 12/2014 | Diep | B64D 45/00 428/66.4 |

FOREIGN PATENT DOCUMENTS

| | | |
|---|---|---|
| EP | 2415661 A1 | 2/2012 |
| EP | 2428444 A1 | 3/2012 |
| FR | 2940959 A1 | 7/2010 |
| JP | 06210748 A | 8/1994 |
| JP | 10325415 A | 12/1998 |
| JP | 2009523655 A | 6/2009 |
| JP | 2009541118 A | 11/2009 |
| JP | 2011500452 A | 1/2011 |
| WO | 9924316 A1 | 5/1999 |
| WO | 2007084227 A2 | 7/2007 |
| WO | 2009056643 A2 | 5/2009 |
| WO | 2013080975 A1 | 6/2013 |

OTHER PUBLICATIONS

JPO, Notice of Reasons for Rejection dated Jun. 5, 2018.
JPO, Notice of Reasons for Rejection, dated Oct. 23, 2018.

(56) References Cited

OTHER PUBLICATIONS

U.S., Non-Final Office Action; U.S. Appl. No. 13/915,994 (dated Feb. 20, 2015).
U.S., Final Office Action; U.S. Appl. No. 13/915,994 (dated Jun. 3, 2015).
U.S., Non-Final Office Action; U.S. Appl. No. 13/915,994 (dated Nov. 19, 2015).
U.S., Final Office Action; U.S. Appl. No. 13/915,994 (dated Mar. 31, 2016).

* cited by examiner

SELF-BALANCING PRESSURE BULKHEAD

RELATED APPLICATIONS

This application is a divisional of U.S. application Ser. No. 13/915,994 filed on Jun. 12, 2013. The entirety of this priority application is hereby incorporated by reference.

FIELD

The present disclosure relates to pressure bulkheads, and more particularly, pressure bulkheads for use in vehicles.

BACKGROUND

Pressure bulkheads are used in vehicles, such an aircraft, to separate a pressurized compartment from an unpressurized compartment. In one typical application, a pressure bulkhead may be mounted within an aircraft fuselage and attached to the outer skin of the aircraft. Such pressure bulkhead mountings typically are complicated and heavily reinforced.

In one example, a pressure bulkhead may include an outer chord assembly composed of a machined Y-chord, failsafe angle, inner chord, and outer break rings. The bulkhead may be backed up with machined stringer end fittings at every stringer location. The stringer end fittings may have to align across a pressure bulkhead and the bulkhead is installed with heavy and complicated machined titanium Y-chord segments, an aluminum inner chord, web, and a separate bolted aluminum failsafe chord. The bulkhead may also contain a ½-inch thick CFRP (carbon fiber reinforced plastic) splice strap sandwiched between the titanium Y-chord and the fuselage skin, and the titanium stringer end fittings. The manufacturing process may require a difficult and time-consuming manufacturing configuration, drilling, deburring, and fay surface seal due to multiple different materials in stackup (e.g., CFRP, titanium, aluminum).

Such pressure bulkheads may be susceptible to corrosion and fatigue due to differences in material galvanic properties and differing coefficients of thermal expansion. For example, a pressure bulkhead having a thick stack up of skin, splice strap, and Y-chord also may require large fastener sizes (e.g., ⅜ in. diameter bolts in the crown and 5/16 in. diameter bolts in the keel) that increase weight due to fastener spacing requirements. In one aircraft application, an aft pressure bulkhead integration was redesigned in an attempt to improve efficiency of an aft pressure bulkhead (APB) chord assembly. The new configuration changed the titanium Y-chord to a T-chord and eliminated the requirements for an aluminum inner chord and failsafe chord. The APB assembly foreshortened the CFRP splice plate so it was no longer trapped between the fuselage skin and the new titanium T-chord thus reducing overall stack up and reduced fastener size (¼ in. diameter bolts all around).

Accordingly, there remains a need for a compact, lightweight and low-cost pressure bulkhead having relatively simple construction.

SUMMARY

In one embodiment, a pressure bulkhead for a vehicle disclosed. The pressure bulkhead is configured to separate a pressurized interior from an unpressurized interior of the vehicle. The pressure bulkhead includes a bulkhead wall having a radially inner disk and a radially outer compression ring. The radially inner disk has a surface and a first thickness and the radially outer compression ring having a second thickness that is greater than the first thickness. The radially outer compression ring defines a periphery of the bulkhead wall and the second thickness of the radially outer compression ring is effective to provide a strength to oppose meridional and hoop stresses across the surface of the radially inner disk in response to a pressure differential across the bulkhead wall. The pressure bulkhead also includes an attachment ring that is affixed to the periphery of the bulkhead wall. The attachment ring has an inner band and an outer band. The outer band defines a concave surface that is configured to face towards the unpressurized interior of the vehicle.

In yet another embodiment, a vehicle is disclosed. The vehicle includes a pressurized interior and an unpressurized interior and a pressure bulkhead separating the pressurized interior from the unpressurized interior of the vehicle. The pressure bulkhead includes a bulkhead wall having a radially inner disk and a radially outer compression ring. The radially inner disk has a surface and a first thickness and the radially outer compression ring having a second thickness that is greater than the first thickness. The radially outer compression ring defines a periphery of the bulkhead wall and the second thickness of the radially outer compression ring is effective to provide a strength to oppose meridional and hoop stresses across the surface of the radially inner disk in response to a pressure differential across the bulkhead wall. The pressure bulkhead also includes an attachment ring that is affixed to the periphery of the bulkhead wall. The attachment ring has an inner band and an outer band. The outer band defines a concave surface that is configured to face towards the unpressurized interior of the vehicle.

In still another embodiment, a method for mounting a bulkhead wall in an aircraft is disclosed. The method includes affixing an attachment ring to a fuselage skin of the aircraft. The attachment ring includes an inner band and an outer band. The outer band defines a concave surface. The method also includes directing the concave surface of the outer band towards a unpressurized interior of the aircraft. The method further includes separating the unpressurized interior from a pressurized interior of the aircraft by attaching an outer periphery of the bulkhead wall to the attachment ring. The bulkhead wall has a radially inner disk and a radially outer compression ring, and the radially inner disk has a first thickness and the radially outer compression ring has a second thickness that is greater than the first thickness. The radially outer compression ring defines a periphery of the bulkhead wall. In response to experiencing a pressure differential across the bulkhead wall, the method includes providing, by the radially outer compression ring, a strength to oppose meridional and hoop stresses across the surface of the radially inner disk.

Other objects and advantages of the disclosed pressure bulkhead will be apparent from the following description, the accompanying drawings and the appended claims.

DETAILED DESCRIPTION

Figure 1:
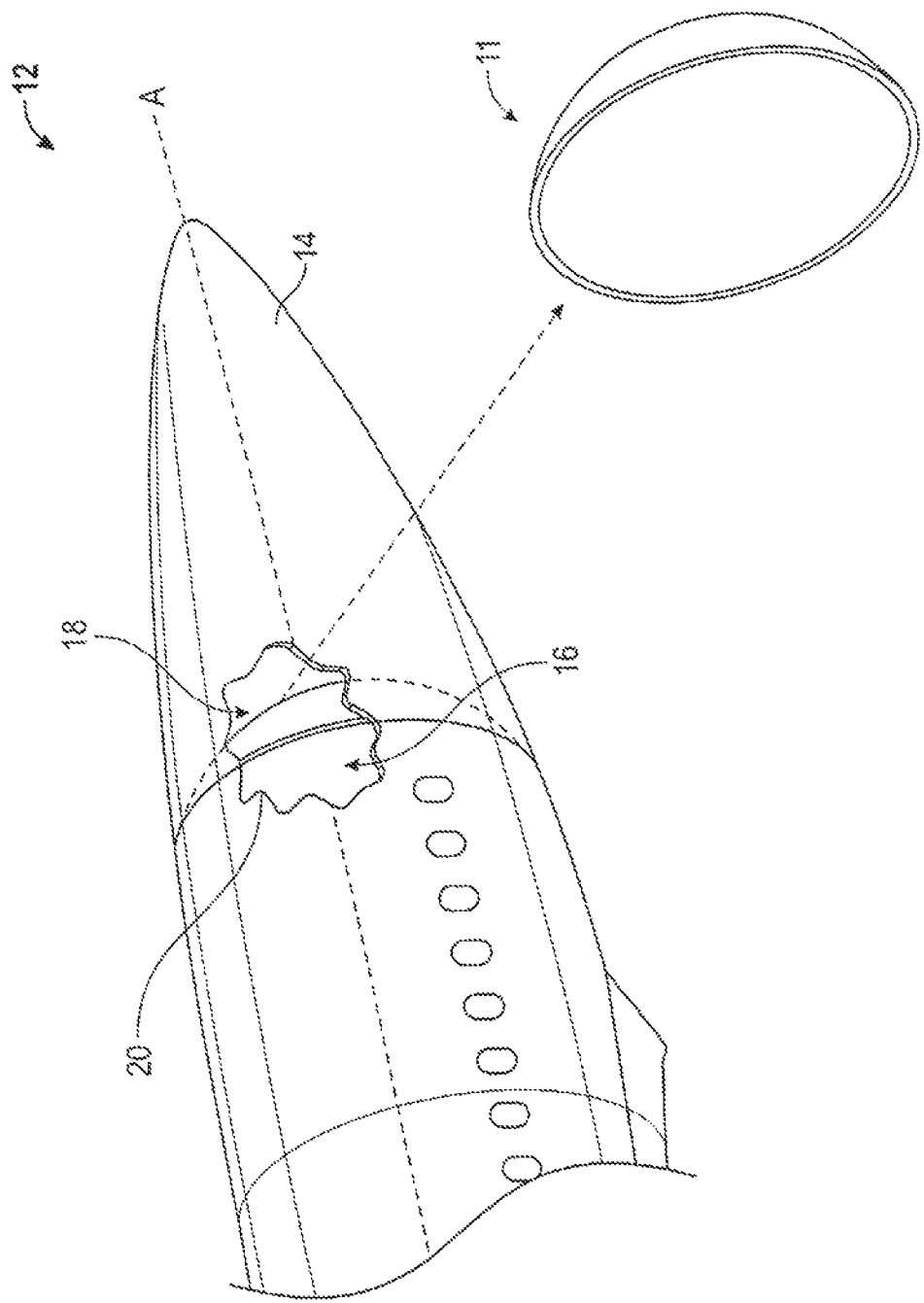
FIG. 1 is a schematic, perspective view of the disclosed self-balancing pressure bulkhead, shown mounted in an aircraft.
Figure 2:
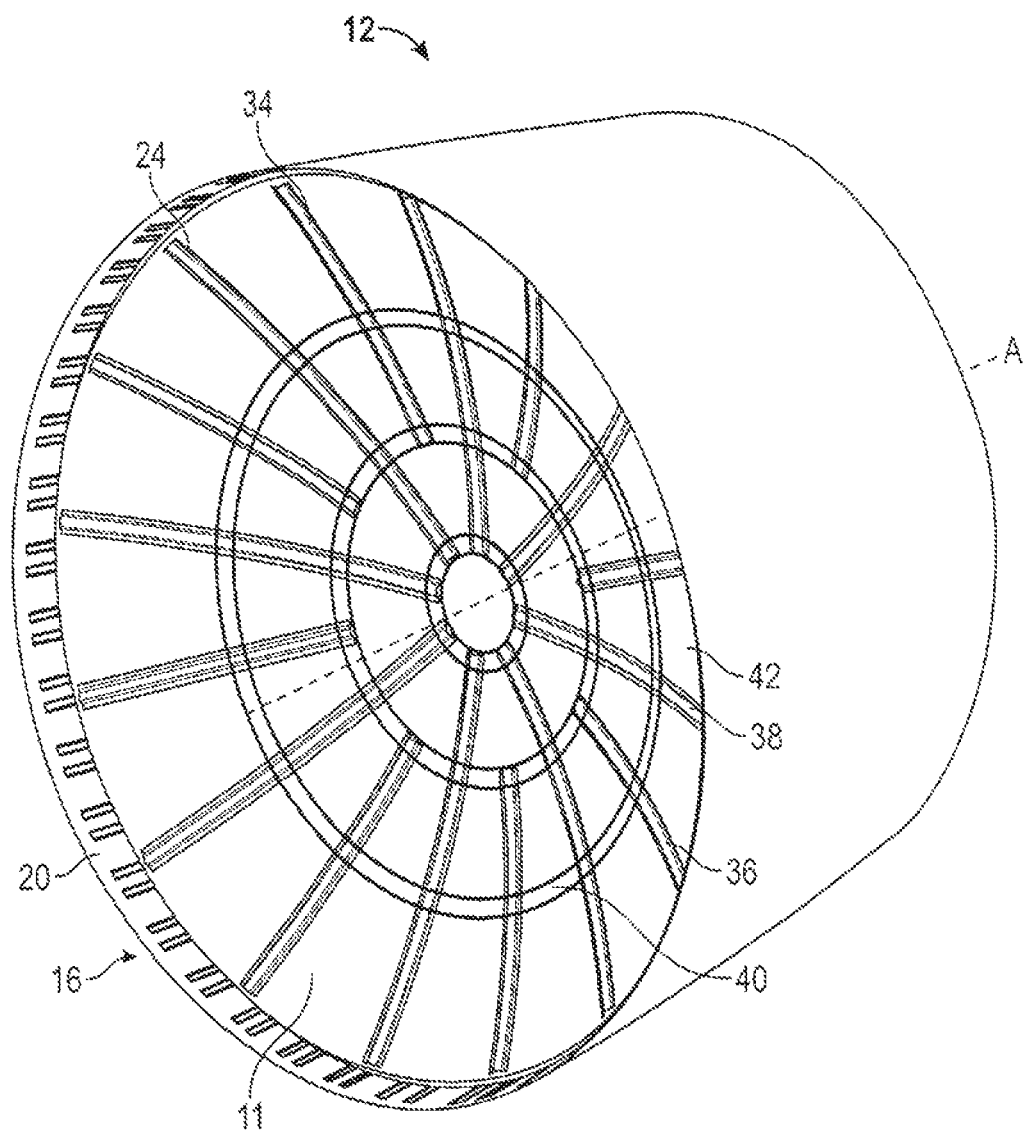
FIG. 2 is a perspective view of the self-balancing pressure bulkhead of FIG. 1, taken from the pressurized side, shown mounted in a section of aircraft fuselage.

As shown in FIGS. 1 and 2, the disclosed self-balancing pressure bulkhead, generally designated 11, may be in the form of a disk or a dome, or be dome-shaped, and shaped for placement inside a vehicle, which in an embodiment may be aircraft 12, for example in the fuselage 14 of the aircraft, to separate a pressurized fuselage interior 16 (e.g., a pressurized cabin) from an unpressurized fuselage interior 18. Other types of vehicles may employ the bulkhead 11, such as spacecraft, reentry vehicles, orbiting space stations, land vehicles, and marine vehicles such as submarines. Pressure bulkhead 11 may be attached to fuselage skin 20 such that the pressure bulkhead does not shift along fuselage longitudinal axis A of the aircraft 12.

Figure 8:
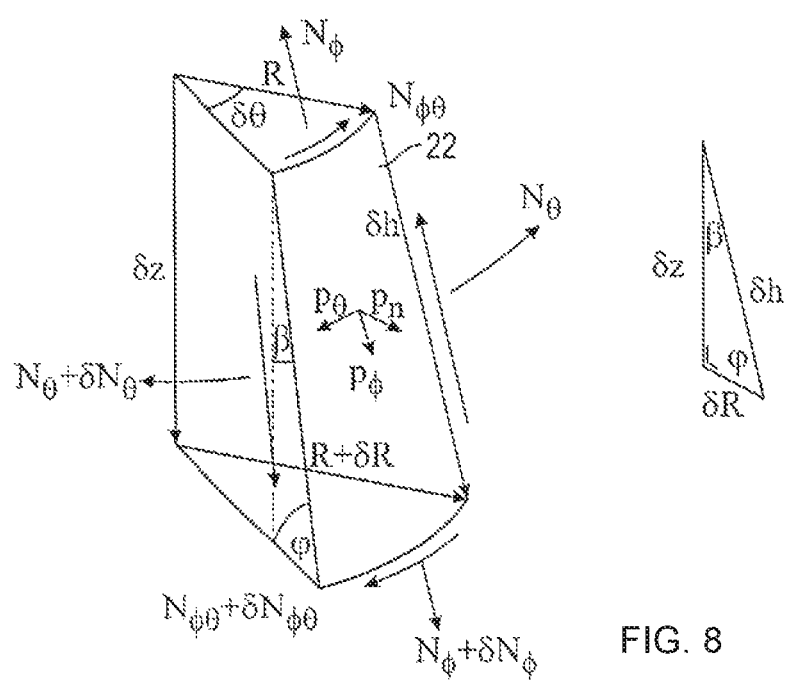
FIG. 8 is a diagram of the forces on the self-balancing pressure bulkhead of FIG. 1 in meridional, hoop and normal directions.

The terms "meridional" and "hoop stresses" with respect to a bulkhead wall may be known to a person of ordinary skill in the art. For example, without being limited to a particular theory, in an infinitesimally small truncated conical bulkhead wall section 22, equilibrium equations for normal, meridional and hoop stresses may also be derived for an infinitesimally small conical shell element as shown in the progression of equations below with reference to FIG. 8. In FIG. 8, $N_\phi$ and $N_\theta$ are membrane stress resultants in the meridional and circumferential (hoop) directions (N/m), respectively, in the bulkhead 11 of FIGS. 1 and 2; $N_{\phi\theta}$ is a shear stress resultant (N/m); $p_n$, $p_\theta$, $p_\phi$ are distributed surface loadings in the normal, circumferential and meridional directions (N/m$^2$) respectively; R is radius of a theoretical barrel/cylinder (m); and θ is the angle of spread. (For a detailed explanation, http://www.kpq.ie/research/shelltheory.html.)

From a triangle: cos φ=sin β and sin φ=cos β

$$\therefore \partial h = \frac{\partial z}{\sin\varphi} = \frac{\partial z}{\cos\beta} \text{ and } \partial R = \frac{\cos\varphi}{\sin\varphi}\partial z = \frac{\sin\beta}{\cos\beta}\partial z,$$

$$\text{hence } R = \frac{\sin\beta}{\cos\beta}z \text{ and } R\partial h = z\partial z\frac{\sin\beta}{\cos\beta}.$$

Use small angle approximation: As ∂θ→0, cos ∂θ→1 and sin ∂θ→∂θ, and also ∂θ$^2$≈0, ∂N$_\theta$≈0, ∂N$_\phi$≈0, ∂N$_{\phi\theta}$≈0, ∂R∂h≈0.

Normal Equilibrium:

$$p_n(R+\partial R)\partial\theta\partial h = N_\theta\partial\theta\partial h\cos\beta \quad (1)$$

$$p_n R\partial\theta\partial h + p_n\partial R\partial\theta\partial h = N_\theta\partial\theta\partial h\cos\beta$$

-continued $$p_n z\partial z\frac{\sin\beta}{\cos\beta}\partial\theta\frac{1}{\cos\beta} = N_\theta\partial\theta\partial z\frac{\cos\beta}{\cos\beta}$$

$$N_\theta = p_n z\frac{\sin\beta}{\cos^2\beta}$$

$$\therefore N_\theta = p_n z\sec\beta\tan\beta$$

Circumferential Equilibrium:

$$N_{\phi\theta}R\partial\theta + N_\theta\partial h = (N_{\phi\theta}+\partial N_{\phi\theta})(R+\partial R)\partial\theta +$$

$$(N_\theta+\partial N_\theta)\partial h + p_\theta(R+\partial R)\partial\theta\partial h + N_{\phi\theta}\partial h\partial\theta\sin\beta$$

$$\partial N_\theta\partial h + N_{\phi\theta}\partial R\partial\theta + \partial N_{\phi\theta}R\partial\theta + \partial N_{\phi\theta}\partial R\partial\theta +$$

$$p_\theta R\partial\theta\partial h + N_{\phi\theta}\partial h\partial\theta\sin\beta = 0$$

$$\frac{\partial N_\theta\partial z}{\cos\beta} + \frac{N_{\phi\theta}\partial z\partial\theta\sin\beta}{\cos\beta} + \frac{\partial N_{\phi\theta}z\partial\theta\sin\beta}{\cos\beta} +$$

$$\frac{\partial N_{\phi\theta}\partial z\partial\theta\sin\beta}{\cos\beta} + \frac{p_\theta z\partial\theta\partial z}{\cos\beta} + \frac{N_{\phi\theta}\partial z\partial\theta\sin\beta}{\cos\beta} = 0$$

$$\frac{\partial N_\theta}{\partial\theta}\cdot\frac{1}{\sin\beta} + N_{\phi\theta} + \frac{z\partial N_{\phi\theta}}{\partial z} + p_\theta z\frac{1}{\cos\beta} + N_{\phi\theta} = 0$$

But from equation, $$N_\theta = p_n z\frac{\sin\beta}{\cos^2\beta}\text{ hence }\frac{\partial N_\theta}{\partial\theta} = \frac{z\partial p_n}{\partial\theta}\frac{\sin\beta}{\cos^2\beta} \quad (2)$$

$$2N_{\phi\theta} + \frac{z\partial N_{\phi\theta}}{\partial z} = -z\frac{1}{\cos\beta}\left(p_\theta + \frac{1}{\cos\beta}z\frac{\partial p_n}{\partial\theta}\right)$$

$$\therefore 2N_{\phi\theta} + \frac{z\partial N_{\phi\theta}}{\partial z} = -z\sec\beta\left(p_\theta + \sec\beta z\frac{\partial p_n}{\partial\theta}\right)$$

Meridional Equilibrium:

$$N_\phi R\partial\theta + N_{\phi\theta}\partial h + N_\theta\partial h\partial\theta\sin\beta =$$

$$p_\phi(R+\partial R)\partial\theta\partial h + (N_\phi+\partial N_\phi)(R+\partial R)\partial\theta + (N_{\phi\theta}+\partial N_{\phi\theta})\partial h$$

$$N_\theta\partial h\partial\theta\sin\beta = p_\phi R\partial\theta\partial h + N_\phi\partial R\partial\theta + \partial N_\phi R\partial\theta + \partial N_\phi\partial R\partial\theta + \partial N_{\phi\theta}\partial h$$

$$\frac{N_\theta\partial h\partial\theta\sin\beta}{\cos\beta} = \frac{p_\phi z\partial\theta\partial z\sin\beta}{\cos^2\beta} + \frac{N_\phi\partial z\partial\theta\sin\beta}{\cos\beta} +$$

$$\frac{\partial N_\phi z\partial\theta\sin\beta}{\cos\beta} + \frac{\partial N_\phi\partial z\partial\theta\sin\beta}{\cos\beta} + \frac{\partial N_{\phi\theta}\partial z}{\cos\beta}$$

$$N_\theta = p_\phi z\frac{1}{\cos\beta} + N_\phi + \frac{z\partial N_\phi}{\partial z} + \partial N_\phi + \frac{\partial N_{\phi\theta}}{\partial\theta}\frac{1}{\sin\beta}$$

$$N_\phi + \frac{z\partial N_\phi}{\partial z} = -\frac{\partial N_{\phi\theta}}{\partial\theta}\frac{1}{\sin\beta} + N_\theta - p_\phi z\frac{1}{\cos\beta} - \partial N_\phi$$

But from Equation 1, $$N_\theta = p_n z\frac{\sin\beta}{\cos^2\beta} \quad (3)$$

$$N_\phi + \frac{z\partial N_\phi}{\partial z} = -\frac{1}{\sin\beta}\frac{\partial N_{\phi\theta}}{\partial\theta} + z\frac{1}{\cos\beta}\left(p_n\frac{\sin\beta}{\cos\beta} - p_\phi\right)$$

-continued $$\therefore N_\phi + \frac{z \partial N_\phi}{\partial z} = -\operatorname{cosec}\beta \frac{\partial N_{\phi\theta}}{\partial \theta} + z\sec\beta(p_n\tan\beta - p_\phi)$$

Figure 3:
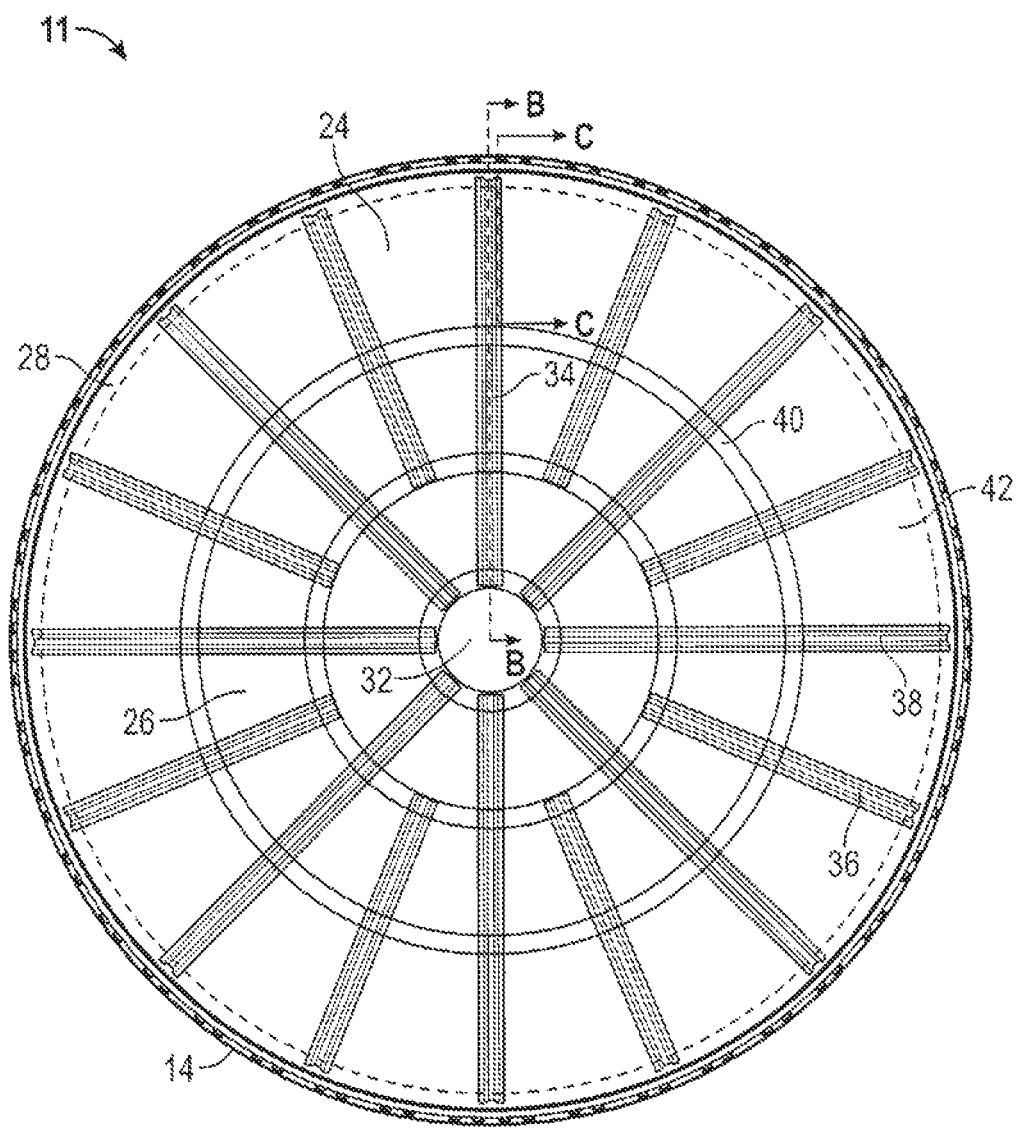
FIG. 3 is a front elevational view of the self-balancing pressure bulkhead of FIG. 1, taken from the pressurized side, shown mounted in the section of aircraft fuselage.

In an embodiment, as shown in FIG. 3, the pressure bulkhead 11 may include a bulkhead wall 24 having a radially inner disk 26 and a radially outer compression ring 28, the outer compression ring being reinforced to balance meridional and hoop stresses sustained by the bulkhead wall in response to a pressure differential across the pressure bulkhead. The radially inner disk 26 may be unitary with the outer compression ring 28 and made of the same material as the outer compression ring.

Figure 4:
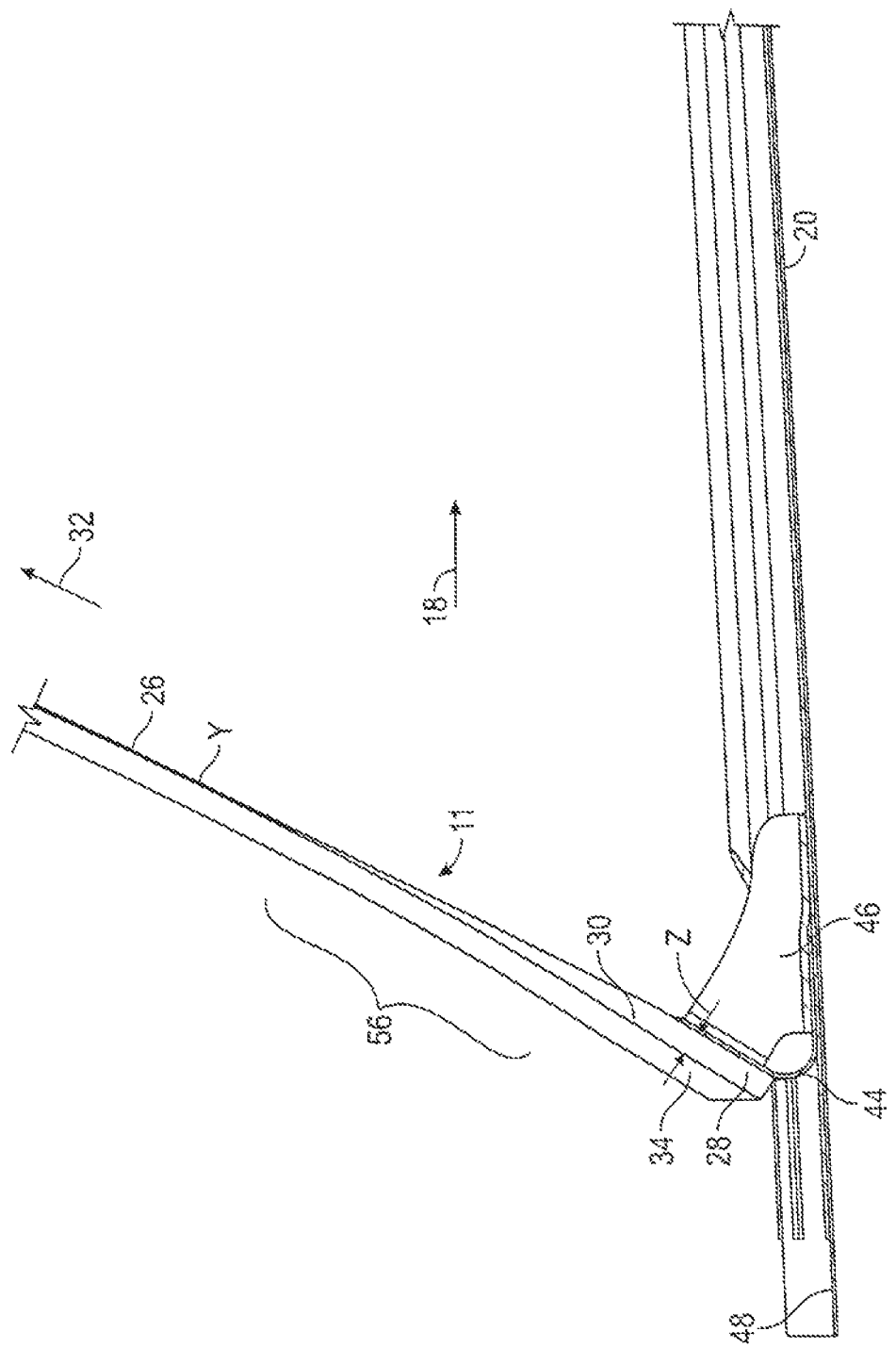
FIG. 4 is a detail taken at line C-C of FIG. 3.
Figure 5:
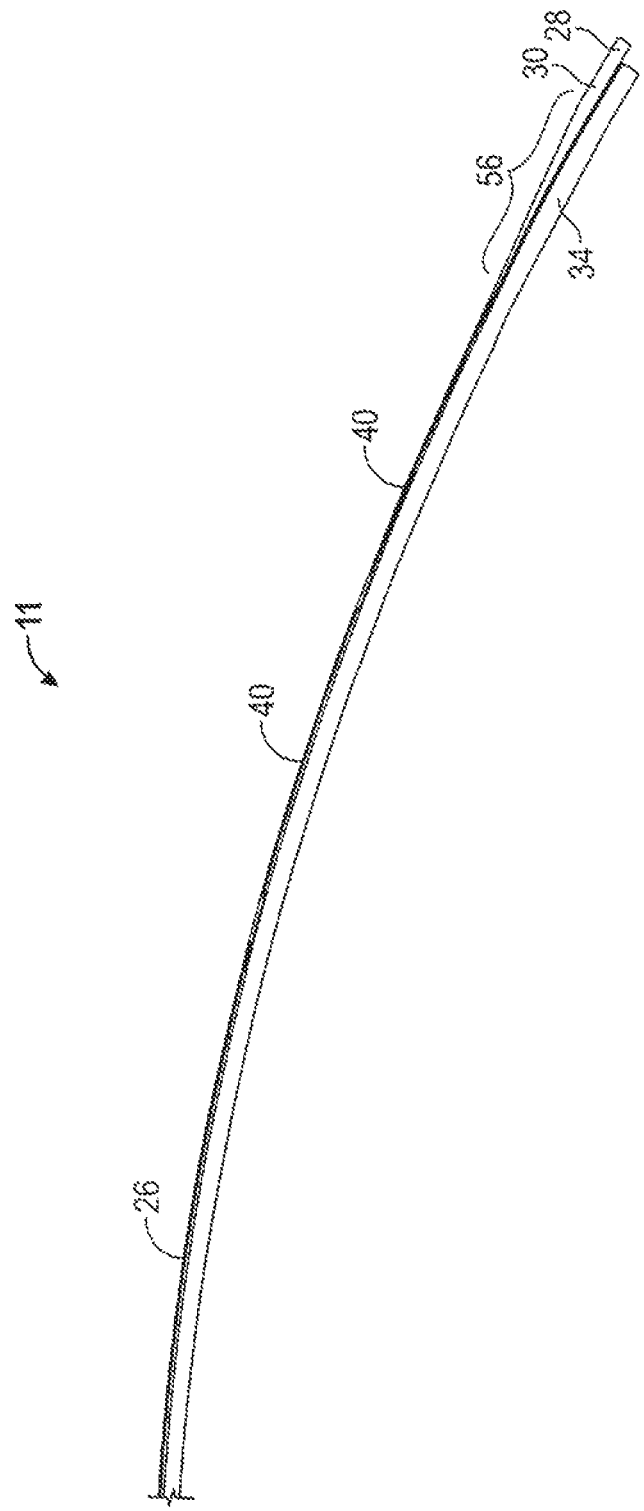
FIG. 5 is a detail taken at line B-B of FIG. 3.

In an embodiment, as shown in FIGS. 3, 4, and 5, the radially inner disk 26 may have a first thickness y, and the outer compression ring 28 may have a second thickness z greater than the first thickness y. In an embodiment, the thickness of the radially inner disk 26 tapers from an outer periphery 30 adjacent the outer compression ring 28 to a center 32 of the pressure bulkhead 11.

In an embodiment, the taper:distance ramp may be from about 1:5 to about 1:100. In an embodiment, the bulkhead wall 24, that is, the radially inner disk 26 and the outer compression ring 28, may be made of carbon fiber reinforced plastic (CFRP). In an embodiment, the taper:distance ramp for a CFRP bulkhead wall may be from about 1:10 to about 1:100.

In an embodiment, the bulkhead wall 24, that is, the radially inner disk 26 and the outer compression ring 28, may be made of a metal, for example, aluminum or an aluminum alloy. In an embodiment, the taper:distance ramp for a metal bulkhead wall may be from about 1:5 to about 1:10. In an embodiment, the ramp may be from a step function to a ramp from 1:1 to 1:100.

In an embodiment, the pressure bulkhead 11 further may include a plurality of stiffeners 34 attached to the bulkhead wall 26 and extending in a radial direction, for example, a meridional direction, from center 32 toward the outer compression ring 28. The stiffeners 34 may be evenly spaced about the bulkhead wall 26 in a spoke-like fashion as shown in FIG. 3, or in embodiments may be unevenly spaced. The plurality of stiffeners 34 may include a shorter stiffener 36 and/or a longer stiffener 38.

Figure 6:
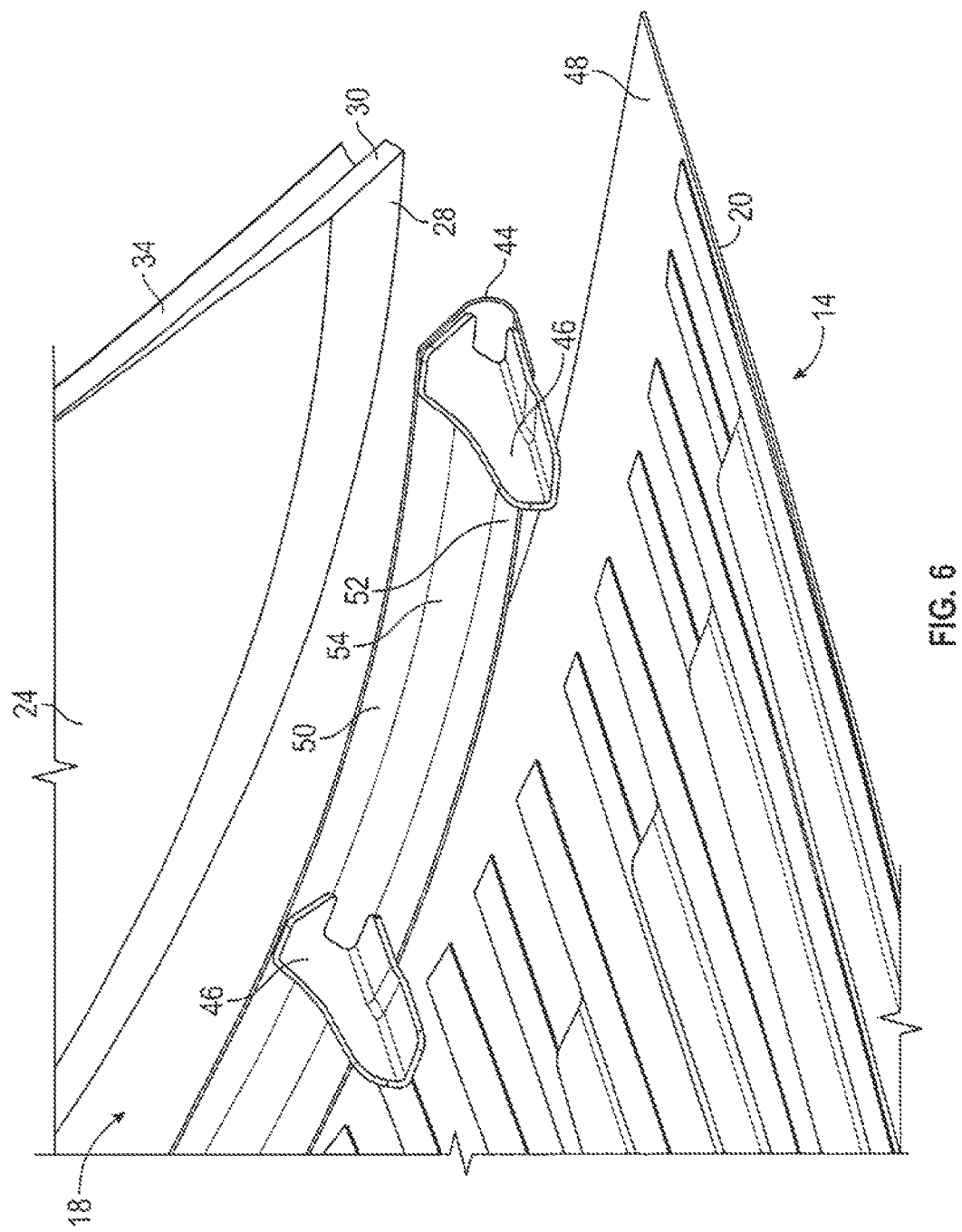
FIG. 6 is a detail showing an exploded view in perspective of the self-balancing pressure bulkhead of FIG. 1 and an associated vehicle fuselage.
Figure 7:
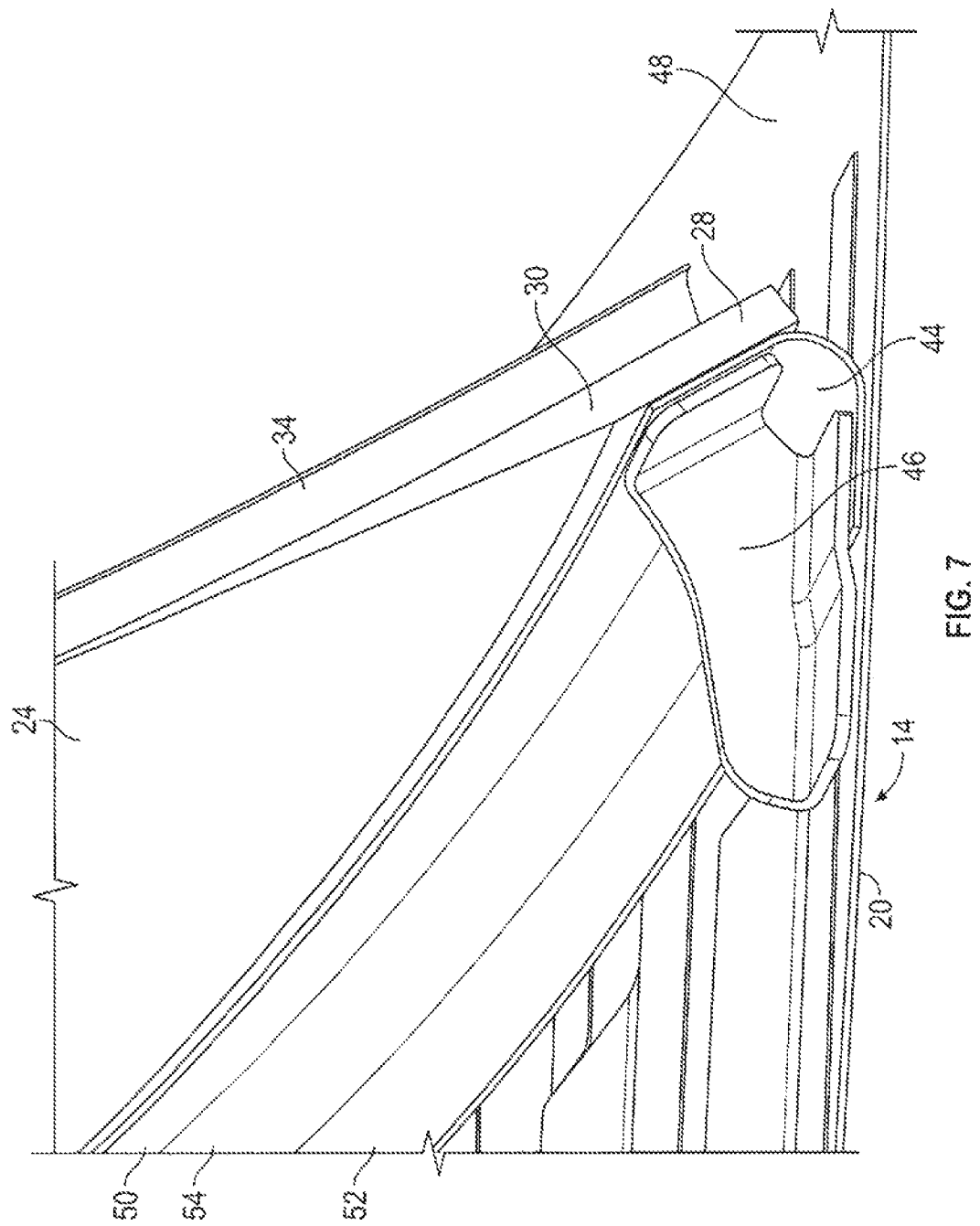
FIG. 7 is a detail showing a perspective view of the self-balancing pressure bulkhead of FIG. 1, annular bracket, and clip for mounting the pressure bulkhead to the aircraft fuselage.

In an embodiment, the bulkhead 11 may include one or more tear straps and/or reinforcement regions, for example, annular tear straps 40 attached to the bulkhead wall 24 (see FIG. 2). Stiffeners 34 and annular tear strips 40 may form a plurality of tear regions 42. In an embodiment, the reinforcement regions may be of any configuration, dimension and/or orientation along the bulkhead wall, for example, those known to one of skill in the art as polar or Cartesian regions, With reference to FIGS. 4, 6, and 7, in an embodiment, the pressure bulkhead 11 may include an attachment mechanism in the form of an attachment ring 44 attached to the outer compression ring 28. In another embodiment, the attachment of the bulkhead wall 24 to the attachment ring 44 may be by means such as by an adhesive, by a plurality of screws (not shown) spaced about the periphery of the bulkhead wall 24, or by rivets (not shown) spaced about the periphery of the bulkhead wall, and the like.

With reference to FIGS. 1, 4, 6, and 7, in an embodiment, the bulkhead 10 may further comprise a plurality of clips 46 configured to attach the attachment ring 44 to a wall 48 of, for example, an aircraft fuselage 14. In an embodiment, the wall 48 may be the skin 20 of an aircraft. The clips 46 may be attached to the skin 20 of the aircraft by, for example, bolting the clips to the skin.

With reference to FIGS. 1, 4, 5, 6, and 7, in an embodiment, the pressure bulkhead 10 may include a bulkhead wall 24 having a radially inner disk 26 made of an isotropic carbon fiber reinforced plastic laminate, and an outer compression ring 28 made of an orthotropic carbon fiber reinforced plastic laminate attached to and extending about a periphery 30 of the radially inner disk 26. In an embodiment, the outer compression ring 28 may be selected to be of sufficient strength to balance meridional and hoop stresses sustained by the dome-shaped bulkhead wall 24 in response to a pressure load applied to the bulkhead wall, such as a pressure differential across the bulkhead wall. In an embodiment, a taper region 56 of radially inner disk 26 extending from periphery 30 toward center 32 may include isotropic carbon fiber reinforced plastic laminate and/or orthotropic carbon fiber reinforced plastic laminate.

The terms "isotropic carbon reinforced plastic laminate" and "orthotropic carbon reinforced plastic laminate" may be known to a person of ordinary skill in the art and such laminates may be constructed according to known methods. In an embodiment, an orthotropic carbon reinforced plastic laminate may include laminates preferentially oriented along a circumferential, or hoop, stress resultant to balance such pressure-load stresses. With reference to FIG. 8, normal, circumferential (hoop), and meridional resultants calculated from $p_n$, $p_\theta$, $p_\sigma$ are used to determine sufficient laminate strengths to react or oppose such resultants across the entire bulkhead 10. Such calculations may be known to a person of skill in the art of mechanical stress modeling.

With reference to FIGS. 1, 4, 6, and 7, in an embodiment, a pressure bulkhead 10 may include a bulkhead wall 24 having a radially inner disk 26 made of metal and having a first thickness y, and a compression ring 28 made of metal attached to and extending about a periphery 30 of the inner disk. The compression ring may have a second thickness z greater than the first thickness y and sufficient to balance meridional and hoop stresses sustained by the bulkhead wall 24 in response to a pressure load applied to the bulkhead wall. In an embodiment, the metal may be aluminum, titanium, a mixture thereof,or an alloy of either or both aluminum and titanium.

With reference to FIGS. 1-7, in an embodiment, there may be provided a vehicle 12 having a fuselage 14 enclosed by a skin 20; and a pressure bulkhead 10 attached to the skin, about a periphery 30 of the outer compression ring 28. In embodiments, the vehicle 12 may be one of an aircraft, a spacecraft, a marine vessel, and a land vehicle.

With reference to FIGS. 1-7, in an embodiment, the periphery 30 of the bulkhead wall 24 may comprise an attachment ring 44 having a radially inner band 50 and a radially outer band 52. The attachment ring 44 may be shaped to form a concave surface 54 oriented toward a non-pressurized section 18 of the vehicle fuselage 14. The radially outer band 52 may be attached to the skin 20 of the vehicle fuselage 14. The radially inner band 50 may be attached to the compression ring 28.

With reference to FIGS. 1-7, in an embodiment, a method of mounting a pressure bulkhead 10 in a vehicle, for example, an aircraft, includes affixing to a fuselage skin 20 of the aircraft an attachment ring 44 having an inner band 50 and an outer band 52 defining a concave surface 54 such that the concave surface 54 is directed toward a non-pressurized section 18 of the aircraft when the aircraft fuselage is under a pressure load; and attaching a periphery 30 of a bulkhead wall 24 to the attachment ring 44, the bulkhead wall 24 having a radially inner disk 26 and a radially outer compression ring 28, the inner disk 26 and outer compression ring 28 being made of the same material, the material being one of carbon fiber reinforced plastic and/or metal, the outer compression ring 28 being of sufficient strength to balance meridional and hoop stresses sustained by the bulkhead wall 24 in response to a pressure load applied to the bulkhead wall 24.

In an embodiment, the attachment ring 44 and/or the clip 46 is made of one of carbon fiber reinforced plastic and/or metal. In another embodiment the installing may further comprise a plurality of clips 46 on the concave surface 54 which clips '46 are configured to fix the attachment ring 44 to the skin 48.

In an alternative embodiment the bulkhead wall 24 may be attached to the attachment ring 44 by mounting the periphery 30 and/or the compression ring 28 on the concave surface 54, that is, between the attachment ring 44 and the clip 46.

The bulkhead 10 described herein provides a lightweight alternative to conventional pressure bulkheads. By providing a relatively strong compression ring 28 that is connected to a relatively weaker, and in some embodiments thinner, radially inner disk 26, the compression ring provides resistance to the hoop stress imposed by pressure differential across the surface of the radially inner disk. In some embodiments, the outer compression ring 28 may be made of the same material as the radially inner disk 26, such as CFRP, in which case the outer compression ring may be relatively thick and the radially inner disk may taper in thickness radially inward to the center of the radially inner disk.

Figure 9:
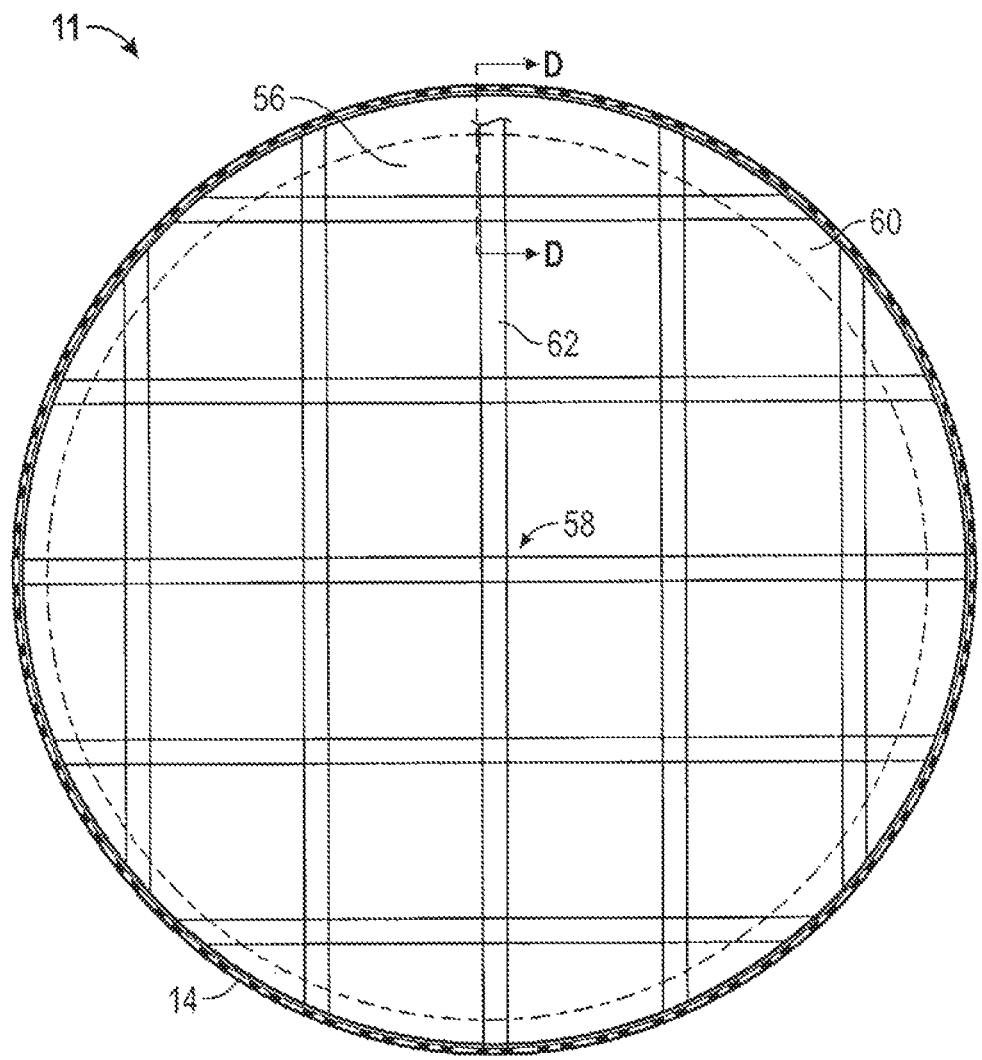
FIG. 9 is a front elevational view of an alternative embodiment of the disclosed self-balancing pressure bulkhead, taken from the pressurized side.
Figure 10:
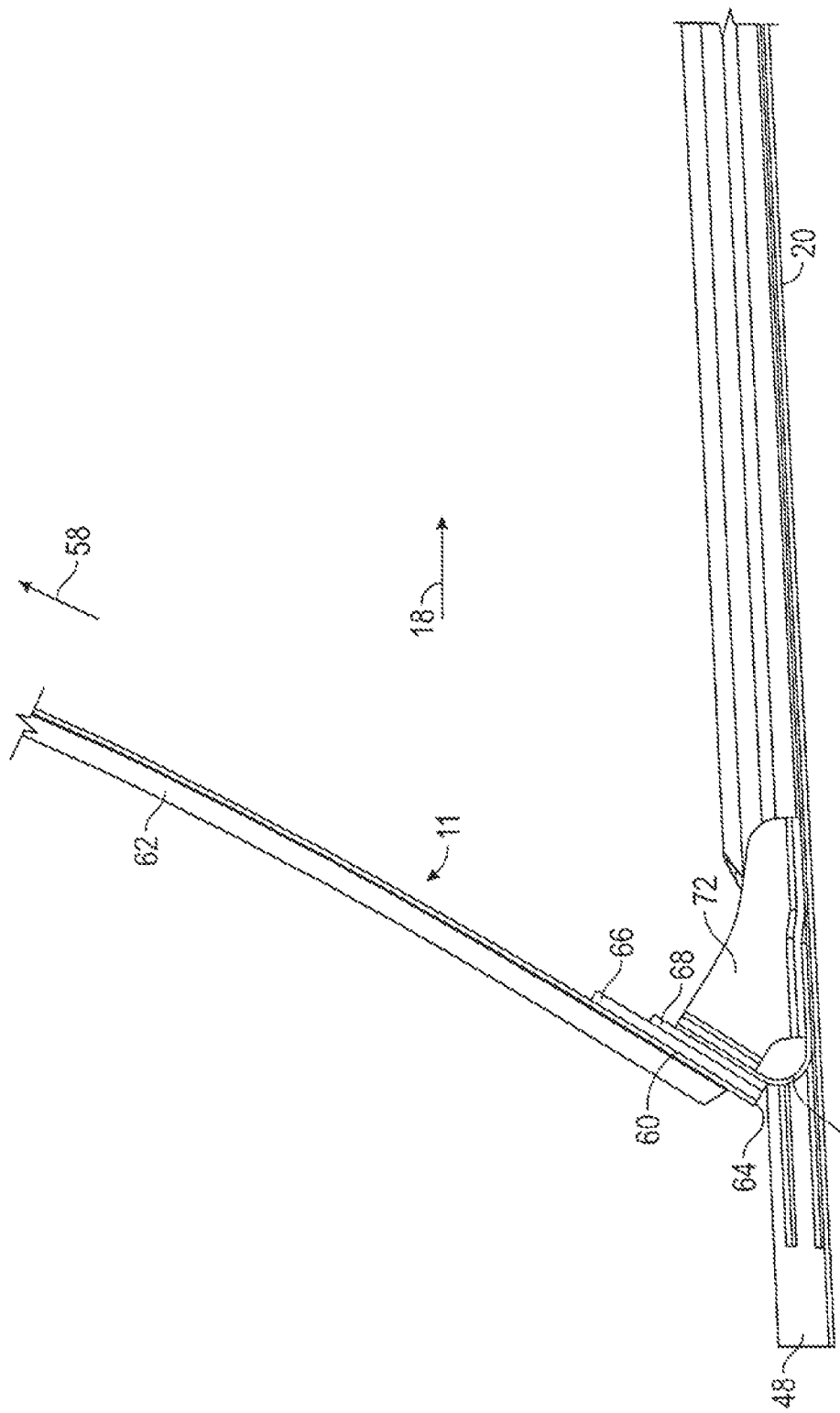
FIG. 10 is a detail taken at line D-D of FIG. 9.

With reference to FIG. 9 and FIG. 10, in an alternative embodiment, the pressure bulkhead 11' may include bulkhead wall 56 of substantially uniform thickness from center 58 to periphery 60. The pressure bulkhead 11' further may include a plurality of stiffeners 62 attached to the bulkhead wall 56 in a Cartesian configuration. From periphery 60 to the edge 64, an attachment mechanism in the form of one or more doubler rings 66, 68 may be in contact with bulkhead wall 56 and a structure to join the bulkhead wall to the skin. In an embodiment, the one or more doubler rings 66, 68 may contact the bulkhead wall on either side of bulkhead wall 56 or on one side of the bulkhead wall 56. In an embodiment, the one or more doubler rings 66, 68 may be of the same or of different size. In an embodiment, two or more doubler rings may be placed on both sides of the bulkhead wall 56. The bulkhead wall may be made of any suitable material, for example, CFRP and/or metal. The doubler ring may be made of any suitable material, for example CFRP and/or metal.

In another alternative embodiment, the one or more doubler rings 66, 68 may be attached to attachment ring 70. Attachment ring 70 may be shaped to form a concave surface oriented toward a non-pressurized section 18 of the vehicle fuselage 14 and the attachment ring 70 may be attached to the wall 48.

The bulkhead 11 may further comprise a plurality of clips 72 configured to attach the attachment ring 70 to wall 48 of, for example, an aircraft fuselage 14. In an embodiment, the wall 48 may be the skin 20 of an aircraft. The clips 72 may be attached to the skin 20 of the aircraft by, for example, bolting the clips to the skin.

While the forms of apparatus and methods disclosed herein constitute preferred embodiments of the invention, it is to be understood that the invention is not limited to these precise forms of apparatus, and that changes may be made therein without departing from the scope of the invention.

What is claimed is:

1. A pressure bulkhead for a vehicle, wherein the pressure bulkhead is configured to separate a pressurized interior from an unpressurized interior of the vehicle, the pressure bulkhead comprising:
a bulkhead wall having a periphery, a radially inner disk, and a radially outer compression ring having a thickness that is effective to provide a strength to oppose meridional and hoop stresses across the radially inner disk in response to a pressure differential across the bulkhead wall; and
an attachment ring that is affixed to the periphery of the bulkhead wall, the attachment ring having an inner band and an outer band, wherein the outer band defines a concave surface that is configured to face towards the unpressurized interior of the vehicle.

2. The pressure bulkhead of claim 1, wherein the attachment ring is composed of at least one of carbon fiber reinforced plastic and metal.

3. The pressure bulkhead of claim 1, wherein the radially inner disk and the radially outer compression ring are composed of the same material.

4. The pressure bulkhead of claim 1, wherein the radially inner disk and the radially outer compression ring are both composed of at least one of carbon fiber reinforced plastic and metal.

5. The pressure bulkhead of claim 1, further comprising a plurality of attachment clips that are located along the concave surface of the outer band of the attachment ring.

6. The pressure bulkhead of claim 5, wherein the attachment clips are configured to affix the attachment ring to a wall of the vehicle.

7. The pressure bulkhead of claim 1, wherein the attachment ring is affixed to the bulkhead wall by mounting the periphery of the bulkhead wall on the concave surface of the attachment ring.

8. The pressure bulkhead of claim 1, wherein the attachment ring is affixed to the bulkhead wall by mounting the radially outer compression ring on the concave surface of the attachment ring.

9. A vehicle, comprising:
a pressurized interior and an unpressurized interior; and
a pressure bulkhead separating the pressurized interior from the unpressurized interior of the vehicle, the pressure bulkhead comprising:
a bulkhead wall having a radially inner disk and a radially outer compression ring, the radially inner disk having a surface and a first thickness and the radially outer compression ring having a second thickness that is greater than the first thickness, wherein the radially outer compression ring defines a periphery of the bulkhead wall and the second thickness of the radially outer compression ring is effective to provide a strength to oppose meridional and hoop stresses across the surface of the radially inner disk in response to a pressure differential across the bulkhead wall; and
an attachment ring that is affixed to the periphery of the bulkhead wall, the attachment ring having an inner band and an outer band, wherein the outer band defines a concave surface that is configured to face towards the unpressurized interior of the vehicle.

10. The vehicle of claim 9, wherein the attachment ring is composed of at least one of carbon fiber reinforced plastic and metal.

11. The vehicle of claim 9, wherein the radially inner disk and the radially outer compression ring are composed of the same material.

12. The vehicle of claim 9, wherein the radially inner disk and the radially outer compression ring are both composed of at least one of carbon fiber reinforced plastic and metal.

13. The vehicle of claim 9, further comprising a plurality of attachment clips that are located along the concave surface of the outer band of the attachment ring.

14. The vehicle of claim 13, wherein the attachment clips are configured to affix the attachment ring to a wall of the vehicle.

15. The vehicle of claim 9, wherein the attachment ring is affixed to the bulkhead wall by mounting the periphery of the bulkhead wall on the concave surface of the attachment ring.

16. The vehicle of claim 9, wherein the attachment ring is affixed to the bulkhead wall by mounting the radially outer compression ring on the concave surface of the attachment ring.

17. The vehicle of claim 9, wherein the vehicle is one of an aircraft, a spacecraft, a marine vessel, and a land vehicle.

18. A method for mounting a bulkhead wall in an aircraft, the method comprising:
affixing an attachment ring to a fuselage skin of the aircraft, wherein the attachment ring includes an inner band and an outer band, the outer band defining a concave surface;
directing the concave surface of the outer band towards an unpressurized interior of the aircraft;
separating the unpressurized interior from a pressurized interior of the aircraft by attaching an outer periphery of the bulkhead wall to the attachment ring, wherein the bulkhead wall has a radially inner disk and a radially outer compression ring and the radially inner disk has a first thickness and the radially outer compression ring has a second thickness that is greater than the first thickness, and wherein the radially outer compression ring defines a periphery of the bulkhead wall; and
in response to experiencing a pressure differential across the bulkhead wall, providing, by the radially outer compression ring, a strength to oppose meridional and hoop stresses across the surface of the radially inner disk.

19. The method of claim 18, further comprising:
locating a plurality of attachment clips along the concave surface of the outer band of the attachment ring; and
affixing the attachment ring to a wall of the aircraft by the attachment clips.

20. The method of claim 18, further comprising:
affixing the attachment ring to the bulkhead wall by mounting the periphery of the bulkhead wall on the concave surface of the attachment ring.

* * * * *